United States Patent [19]

Bocharov et al.

[11] 4,182,811

[45] Jan. 8, 1980

[54] POLYMERIC GEL CATALYST FOR POLYMERIZATION OF α-OLEFINES, CONJUGATED AND NON-CONJUGATED DIENES

[76] Inventors: Jury N. Bocharov, ulitsa Dokukina, 3, korpus 1, kv. 13; Viktor A. Kabanov, Lomonosovsky prospekt, 3, korpus 1, kv. 3; Marina A. Martynova, ulitsa Stasovoi, 4, kv. 34, all of Moscow; Valery G. Popov, ulitsa 1, 17/1, kv. 3, Moskovskaya oblast, poselok Chernogolovka; Vladimir I. Smetanjuk, ulitsa Stasovoi, 4, kv. 34; Viktor V. Fedorov, 3 Samotechny pereulok, 23, kv. 88, both of Moscow, all of U.S.S.R.

[21] Appl. No.: 881,818

[22] Filed: Feb. 27, 1978

Related U.S. Application Data

[60] Division of Ser. No. 737,108, Oct. 29, 1976, which is a continuation of Ser. No. 490,992, Jul. 23, 1974, abandoned.

[30] Foreign Application Priority Data

Jul. 24, 1973 [SU]  U.S.S.R. .................. 1950384

[51] Int. Cl.$^2$ .................. C08F 4/02; C08F 110/00; C08F 110/02; C08F 136/06
[52] U.S. Cl. .................. 526/69; 252/429 B; 525/328; 525/329; 525/334; 525/336; 525/356; 525/370; 526/139; 526/140; 526/141; 526/142; 526/144; 526/153; 526/159; 526/169.1; 526/169.2; 526/335; 526/348; 526/348.2; 526/351; 526/352; 526/904
[58] Field of Search .................. 526/65, 153, 144, 159, 526/169.1, 169.2, 904, 139-142, 125

[56] References Cited

U.S. PATENT DOCUMENTS

| | | | |
|---|---|---|---|
| 2,927,103 | 3/1960 | Schneider et al. | 526/69 |
| 3,553,181 | 1/1971 | Delbouille et al. | 526/904 |
| 3,553,287 | 1/1971 | Delbouille et al. | 526/904 |
| 3,594,330 | 7/1971 | Delbouille et al. | 526/904 |
| 3,600,367 | 8/1971 | Delbouille et al. | 526/904 |

*Primary Examiner*—Herbert J. Lilling
*Attorney, Agent, or Firm*—Holman & Stern

[57] ABSTRACT

A catalyst for the (co)polymerization of ethylene, α-olefines, conjugated and non-conjugated dienes, a method of preparation, and a mode of using same. The catalyst contains from 0.1 to 50 wt.% of a compound of a transition metal of the IV-VIII Groups chemically combined and distributed over the surface and within the volume of a rubber-like polymeric carrier containing from 1 to 50 wt.% of electron-donor and/or electron-acceptor groups and is in the form of a gel which is swellable, but insoluble in the reaction medium.

A co-catalyst comprising an organic compound of a metal of Groups I-III is employed chemically combined and/or non-combined with the catalyst.

The catalyst is prepared by mixing the metal compound with said carrier swollen or dissolved in a solvent, and by extracting the resulting compound with a solvent.

(Co)polymerization is effected in a solvent such as a hydrocarbon or a hologenated hydrocarbon derivative at a temperature not exceeding 200° C. under a pressure ranging from 0 to 100 atm by separating the catalyst from the (co)polymer during or after the reaction and recycling it back to the (co)polymerization.

9 Claims, No Drawings

POLYMERIC GEL CATALYST FOR POLYMERIZATION OF α-OLEFINES, CONJUGATED AND NON-CONJUGATED DIENES

This is a divisional of application Ser. No. 737,108, filed Oct. 29, 1976 which in turn is a continuation of Ser. No. 490,992, filed July 23, 1974, now abandoned.

The present invention relates to the art of catalysis in polymer chemistry and, more specifically, to a catalyst for polymerization of ethylene, α-olefines, and conjugated, non-conjugated dienes and copolymers thereof; it also relates to a method of preparing and using same.

BACKGROUND OF THE INVENTION

Heterogeneous and homogeneous catalysts for polymerization and copolymerization of ethylene and other olefines are known in the art, for example oxides and complex organometallic catalysts.

These known catalysts feature certain disadvantages, the most serious of which are: chemical instability (deactivation of the catalysts with time; presence of traces of the catalyst in the polymer which impairs the polymer properties and restricts the range of its application. The use of sophisticated methods for the elimination of the catalyst traces renders the polymer production too complicated and costly.

DESCRIPTION OF THE PRIOR ART

Also known in the art are solid catalysts comprising a compound of a transition metal of Groups IV–VIII deposited onto a solid carrier, such as MeO, $MeCl_2$, $MeCO_3$ (where Me is magnesium and calcium), or onto organic polymers containing electrondonor groups (cf. French Pat. Nos. 1,507,365; 1,518,052; 1,588,369; British Pat. No. 1,119,633). As the polymer carrier homopolymers such as polyamines, polynitriles, polyesters, polydienes, and the like are used.

As the co-catalyst organic compounds of a metal of Groups I–III at a molar ratio to the compound of the transition metal ranging from 1 to 500 are used.

The use, as a carrier, of polar homopolymers which are known to be insoluble or sparingly soluble in hydrocarbon media results, as it has been rightly noted in the above-listed Patents, in the formation of heterogeneous catalysts which are insoluble in hydrocarbon media. In the case of unreticulated polydienes, the formation of solid catalysts has been also observed. Therefore, these catalysts feature the following serious disadvantages: reactions occur only at the catalyst surface; the reaction product contains the catalyst which is difficult to remove and recover.

DESCRIPTION OF THE INVENTON

It is an object of the present invention to provide a highly-stable and highly-efficient catalyst for polymerization and copolymerization of ethylene, α-olefines and dienes which would be capable of producing polymers exempted from the catalyst. Another object of the present invention is to provide a catalyst susceptible to regeneration.

These objects are accomplished by the provision of a catalyst for the polymerization and copolymerization of ethylene, α-olefines, as well as conjugated and non-conjugated dienes which comprises a catalyst per se based on a compound of a transition metal of Groups IV–VIII on a polymetric carrier and a co-catalyst, viz. an organometallic compound of a metal of Groups I–III at a molar ratio between the co-catalyst and the compound of the transition metal of Groups IV–VIII ranging from 1 to 500, wherein the polymeric carrier is a rubber-type polymer or copolymer containing from 1 to 50% by weight of electron-donor and/or electron-acceptor groups, while the catalyst per se contains from 0.1 to 50% by weight of the compound of the transition metal of Groups IV–VIII chemically combined and distributed over the surface, and within the volume of said carrier and comprises a gel which is swellable, but insoluble in the reaction medium.

As the co-catalyst conventional organic compounds of a metal of Groups I–III are used.

It is preferable to use a catalyst which contains, as the compound of a transition metal of Groups IV–VIII, $TiCl_4$, $TiCl_3$, dicyclopentadienyl titanium dichloride—$(C_5H_5)_2TiCl_2$, $Ti(OC_4H_9)_4$; $VCl_4$, $VCl_3$, $VOCl_3$, $VO(OC_2H_5)_3$; $CrCl_3$; $NiCl_2$, and nickel acetylacetonate $(C_5H_7O_2)_2Ni$.

As the catalyst polymeric carrier it is advantageous to employ natural rubber, synthetic rubbers based on conjugated dienes, synthetic rubbers based on ternary copolymers of ethylene, propylene and polyenes, or acetylenes, synthetic siloxane rubber containing unsaturated bonds.

Preferably, use should be made of catalysts with a polymeric carrier containing electron-donor and/or electron-acceptor groups;

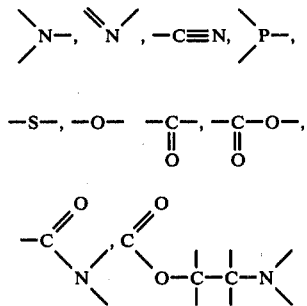

It is advisable to use a catalyst which contains, as a co-catalyst, an organo-metallic compound of a metal of Groups I–III at a molar ratio of the compound to the transition metal of Groups IV–VIII chemically combined, and distributed over the surface and within the volume of the carrier.

In order to control the polymer properties, a catalyst containing two compounds of transition metals of Groups IV–VIII may be used.

In the case of ethylene polymerization, it is advisable to use a catalyst containing, as a carrier, a reticulated copolymer of ethylene, propylene, ethylidenenorbornene and vinylpyridine, and $VCl_4$.

For the polymerization or copolymerization of vinylcyclohexane and conjugated dienes it is advisable to use a catalyst containing, as a carrier, a reticulated copolymer of ethylene, propylene, ethylidenenorbornene and vinylpyridine, and $(C_5H_5)_2TiCl_2$.

In the case of the copolymerization of α-olefines and dienes, it is possible to employ a catalyst which includes, as a carrier, a reticulated copolymer of ethylene, propylene, entylidenenorbornene and vinylpyridine, and $TiCl_3$, $Al(i-C_4H_9)_2Cl$.

METHODS OF PREPARATION

A method of preparing said catalysts contemplates mixing a compound of a transition metal of Groups IV-VIII (A) with a polymeric carrier swollen or dissolved in a liquid hydrocarbon and/or polar organic solvent, which carrier contains from 1 to 50% by weight of electron-donor and/or electron-acceptor groups (B), at a molar ratio between A and B of at least 2; maintaining the resulting mixture in vacuum, in an inert gas atmosphere, or in air at a temperature of no more than 300° C. till the formation of a product, wherein A is chemically combined with said polymeric carrier, and then extracting the thusly prepared catalyst with said solvent to eliminate the transition metal compound which is not combined with the carrier.

In order to prepare the catalyst of the present invention, it is preferable to employ, as A, $TiCl_4$, $(C_5H_5)_2TiCl_2$, $Ti(OC_4H_9)_4$, $VCl_4$, $VOCl_3$, $VO(OC_2H_5)_3$, $NiCl_2$, $Ni(C_5H_7O_2)_2$, $VCl_3$, $TiCl_3$, $CrCl_3$.

In the preparation of the catalyst according to the present invention, it is preferable to use, as a carrier, natural rubber, synthetic rubber based on conjugated dienes, synthetic rubber based on ternary copolymers of ethylene, propylene, and polyene, or acetylenes; synthetic siloxane rubber with a polar monomer grafted thereonto, and containing an electron-donor and/or electron-acceptor group:

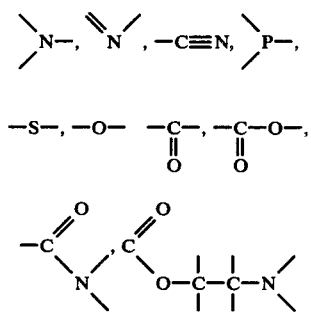

In the method of the present invention, as the polar monomer, preferably vinylpyridine, acrylonitrile, acrylamide, vinyldiphenylphosphine, allyl alcohol, methylmethacrylate, diethylaminoethylmethacrylate, methacrylic acid are used.

The most advantageous process for the preparation of the catalyst of the present inventon is such, wherein prior to mixing a polymer carrier with the compound A, the carrier containing from 1 to 50% by weight of the electron-donor and/or electron-acceptor groups is converted, by way of cross-linking through the unsaturated bonds, to a swellable reticulated polymer insoluble in the solvent used.

An embodiment of the method according to the present invention is possible which contemplates, for the preparation of a catalyst, wherein a co-catalyst is chemically combined with the catalyst per se, a treatment of the latter with an organometallic compound of a Group I-III metal at a molar ratio to A of no more than 10 in a medium of a hydrocarbon, or a halogenated hydrocarbon derivative at a temperature of no more than 200° C., followed by extraction with an absolute solvent in vacuum, or an inert gas atmosphere.

In the latter case, it is preferred, in accordance with the present invention, to employ as A such compounds as $TiCl_4$, $VCl_4$.

In order to prepare a catalyst, wherein a co-catalyst is chemically combined with the catalyst per se, a polymeric carrier, prior to its mixing with A, is treated in accordance with the invention with a solution of an organometallic compound of a Group I-III metal in an absolute hydrocarbon, or halogenated hydrocarbon derivative solvent at a temperature of no more than 200° C., and the resulting product is extracted with said solvent to remove the organometallic compound of the Group I-III metal not combined with the carrier.

The polymerization and copolymerization of ethylene, α-olefines, and conjugated and non-conjugated dienes on gel-like catalysts is effected, in accordance with the present invention, in a solvent such as a hydrocarbon, or a halogenated hydrocarbon derivative at a temperature of no more than 200° C., and under a pressure of from 0 to 100 atm, and followed by separation of the reaction products from the catalyst.

An embodiment of the polymerization process is possible wherein a catalyst, after the separation of the polymerization products is recycled to the polymerization reaction, and this operation is repeated until the catalyst is destroyed. This means deactivation, mechanical degradation and losses of the catalyst during the polymerization process.

When polymerization is effected at a temperature within the range of from 0° to 80° C., the catalyst is separated from the reaction products at a temperature exceeding the polymerization product melting point.

In the case of the polymerization of ethylene, α-olefines and non-conjugated dienes, said polymerization should be preferably conducted at a temperature within the range of from 140° to 200° C. and the polymerization products should be separated continuously from the catalyst during the reaction.

An advantageous embodiment of the method according to the present invention consists in that the polymerization of olefines is conducted in the presence of a catalyst based on $(C_5H_5)_2TiCl_2$ or $VCL_2$ in a medium of an absolute solvent and the reaction products are separated from the catalyst at a temperature exceeding their melting point in air.

In the case of propylene polymerization, an embodiment is possible for the polymerization process, wherein the polymerization is conducted, in accordance with the present invention, in the presence of a catalyst containing $TiCl_3$ and $Al(i-C_4H_9)_2Cl$ and a co-catalyst, viz. $Al(C_7H_{15})_3$.

In the case of vinylcyclohexane polymerization, it is preferable to conduct the polymerization in the presence of a catalyst containing $(C_5H_5)_2TiCl_2$ and a co-catalyst, viz. $Al(i-C_4H_9)_2Cl$ in the medium of absolute cyclohexane.

In the case of the polymerization of conjugated dienes, it is preferable that the polymerization be conducted in the presence of a catalyst containing $(C_5H_5)_2TiCl_2$ and a co-catalyst, viz. an organoaluminium or a halogenorganoaluminium compound.

In particular, in order to produce 1,2-polybutadiene with a yield of over 90%, the polymerization of butadiene is conducted in the presence of a catalyst containing $(C_5H_5)_2TiCl_2$ and a carrier, viz. a cross-linked copolymer of ethylene, propylene, ethylidenenorbornene and vinylpyridine, and a co-catalyst, viz. $Al(i-C_4H_9)_3$.

The catalyst of the present invention are present in the reaction medium in a gel-like condition. Therewith, the compound of the transition metal of Groups IV–VIII which is the principal active component of the catalyst, is chemically combined with the polymeric carrier and distributed over the surface and within the entire volume of the carrier. Due to this, the catalysts of the present invention feature the following advantages:

1. The catalysts feature high activity due to the catalytic action of active centers located not only on the surface but within the catalyst volume as well.

2. The stability of the continuous catalytic action with time is close to respective values of true catalysts. The catalyst retained its catalytic activity after 2,000 hours of testing. Therewith, the catalyst output was achieved amounting to about 500 kg of polyethylene per 1 kg of the transition metal.

3. The catalysts exhibit catalytic action at temperatures within the range of from 0° to 200° C. and under a pressure of from 0 to 100 atm.

4. The catalysts are completely easily separated from a polymer, which is accomplished by dissolving the polymer in a suitable solvent at a temperature within the range of from 0° to 200° C.

This makes it possible to produce polymers exempted from transition metal compounds and, consequently, suitable for use in medicine and the food industry.

5. The catalysts readily lend themselves to regeneration and may be repeatedly used for polymerozation.

The above-mentioned advantages of the gel-like catalysts make it possible to produce polyethylene and other polyolefines by a continuous process, for example in a polymer solution. Therewith, the polymer properties (molecular weight) may be controlled by conventional methods such as by introducing hydrogen into the reaction system. In some cases, for example in ethylene polymerization on a catalyst prepared on the basis of $TiCl_4$, the molecular weight of polyethylene may be varied in a quite simple manner, i.e. by varying the residence time of the polymer in the reaction zone.

On the other hand, some conventional catalytic systems, for example those based on $(C_5H_5)_2TiCl_2$ which are inactive in the polymerization of $\alpha$-olefines and dienes, become active when they are combined with a polymeric carrier in a gel-like catalyst. Thus, on the gel-like catalyst of the present invention it has been possible to obtain, for the first time, polyvinylcyclohexane without a side-reaction of vinylcyclohexane isomerization and stereoregular polymers of conjugated dienes.

The catalysts of the present invention based on vanadium or titanium compounds may be useful for the production of block-and static copolymers, and ter-copolymers of ethylene, propylene, and other olefines and diolefines.

The catalysts of the present invention are simple to prepare; they do not cause corrosion of the apparatus, nor do they adhere to the reactor walls. All handling operations with the catalyst may be performed in air, since the gel-like catalysts are far less chemically active and toxic than, for example, homogeneous catalysts.

Other advantages and merits of the present invention will now become more fully apparent from the following detailed description.

The principal distinctive feature of the catalysts for polymerization and copolymerization of ethylene, $\alpha$-olefines, and conjugated and non-conjugated dienes, according to the present invention, resides in the distribution of active centers within the entire volume of the catalyst as well as in a gel-like condition of the latter in the reaction medium.

Depending on the solubility of a compound of a transition metal, and the swelling capacity of the carrier in the solvent employed, the content of the transition metal compound in the catalyst may be varied within the range of from 0.1 to 50% by weight.

Among the compounds of the transition metals of Groups IV–VIII are inorganic salts and organic compounds of these metals, preferably halides, alkoxides, acetylacetonates, cyclopentadienyl compounds, $\pi$-allyl compounds for example $TiCl_4$, $TiCl_3$, $(C_5H_5)_2TiCl_2$, $Ti(OC_4H_9)_4$, $VCl_4$, $VCl_3$, $VOCl_3$, $VO(OC_2H_5)_3$, $CrCl_3$, $Cr(C_3H_6)_3$, $NiCl_2$, $CoCl_2$, $Ni(C_5H_7O_2)_2$, which are soluble in hydrocarbon or polar organic solvents.

As a polymeric carrier use is made of various polymers, copolymers, ter-copolymers containing electron-donor and/or electron-acceptor groups incorporated in the polymeric carrier and located in the main chain or in side branches of the polymer-carrier chain; such groups may be exemplified by groups containing the elements of Groups V–VII and preferably N, P, O, S, Cl, and various unsaturated bonds. The preferred polymeric carriers are polymers capable of dissolving or swelling in a hydrocarbonic or in a medium of a hydrocarbon halogenated derivative, for example natural rubber, synthetic rubbers based on conjugated dienes, synthetic rubbers based on ternary copolymers of ethylene, propylene and polyenes or acetylene; synthetic siloxane rubbers; synthetic rubbers based on styrene or divinylbenzene. Electron-donor or electron-acceptor groups are either contained in the polymeric carrier, for example in rubbers based on dienes, or specially introduced into the carrier composition by way of a chemical reaction such as that of copolymerization, polycondensation, addition, substitution, elimination (e.g. dehydrogenation, dehydrochlorination). Among the above methods the most preferable is the method of grafting, by way of a radical-type polymerization of polar monomers, such as vinylpyridine, acrylonitrile acrylamide, vinylacetate, vinylpyrrolidone, vinyldiphenylphosphine, allyl alcohol, methylmethacrylate, diethylaminoethylmethacrylate, acrylic and methacrylic acids and the like.

In order to produce a catalyst which is swellable but insoluble in the reaction medium, the polymeric carriers containing electron-donor and/or electron-acceptor groups should be preferably subjected to a cross-linking reaction in order to obtain a reticulated polymer. Various cross-linking through unsaturated bonds contained in a polymer, may be by means of the peroxide-type initiators or other various curing compositions.

Compounds of the transition metals of Groups IV–VIII may be combined with the polymeric carrier through various chemical bonds such as homopolar, heteropolar, coordinative bond due to $\pi$-electrons or n-electrons. The reaction between said reactants is effected at a temperature within the range of from 0° to 200° C. depending on the reactivity of the reactants in hydrocarbons or polar organic solvents which are inert in respect of the compound of a transition metal of Groups IV–VIII. If the latter is inert with respect to air oxygen, the reaction is conducted in air, otherwise, it is effected in vacuum, or an inert gas atmosphere. Upon completion of the reaction, the resulting catalysts are carefully extracted with a solvent so to remove traces of a compound of the metal of Groups IV–VIII not combined with the polymeric carrier.

Under conditions similar to those described hereinabove the gellike catalysts are prepared by incorporating, in addition to the compound of a transition metal from Groups IV–VIII, an organic compound of a metal from Groups I–III. The sequence of application of the components onto the polymeric carrier may be arbitrary. Thus, the organic compound of a metal from Groups I–III may be combined in the polymeric carrier after combining the compound of a transition metal from Groups IV–VIII or, on the contrary, the carrier swollen, or dissolved in the solvent employed may be first treated with a solution of an organometallic compound of a metal from Groups I–III and then with a solution of the compound of a transition metal from Groups IV–VIII. The latter method is used, for example, for the preparation of a catalyst incorporating groups:

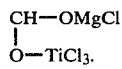

The polymerization and copolymerization of ethylene and other olefines in the presence of the catalyst of the present invention is effected in a medium of aliphatic, alicyclic, aromatic hydrocarbons or their halogenated derivatives (preferably chlorinated ones) at a temperature within the range of from 0° to 200° C., and under a pressure of from 0 to 100 atm. Pressure in the reactor is maintained constant due to the gaseous monomer supply. The catalyst is employed in the form of granules of from 0.1–5 mm in size swollen in the above-mentioned solvent, or in the form of a film which, unlike heterogeneous catalysts, is easily permeable, over the entire volume, for the molecules of the monomer and polymer dissolved.

The dry catalyst is introduced into the reactor in a vacuum or in an inert gas atmosphere; when in gel-like form, the catalyst is introduced into the reactor in a medium of an absolute solvent. The catalyst swollen in the solvent employed is added with a co-catalyst, viz. an organic compound of a metal from Groups I–III. It is preferable to employ organolaluminium compounds. In order to increase the polymer yield, a molar ratio between the co-catalyst and compound of the transition metal is increased, or the co-catalyst is introduced into the reactor additionally during the polymerization. After the formation of the catalytical complex involving the catalyst per se and the co-catalyst, the monomer is introduced into the reaction system. (The monomer may be introduced even prior to the introduction of the co-catalyst). In the case of producing block-copolymers, monomers are supplied successively, with each subsequent monomer being supplied only after the complete removal of the previous non-polymerized monomer from the reactor.

The resulting polymer is dissolved and separated from the catalyst in the reaction medium during the reaction or, if the polymer is insoluble at a low temperature, it is separated from the catalyst by heating means in a solvent in a separate apparatus. The polymerization of ethylene and α-olefines may be effected at a temperature ranging from 140° to 200° C. in a polymer solution.

If the catalyst is separated from the polymer during the reaction or in a separate apparatus without humidity and air oxygen, it may be re-used in the polymerization with the addition of a fresh portion of the co-catalyst, viz. and organometallic compound a metal from groups I–III. The individual catalysts prepared, for example, on the basis of $(C_5H_5)_2TiCl_2$ or $VCl_4$ may be separated from the polymer in the air at a temperature of up to 200° C. and then repeatedly used in the polymerization.

The polymer after separation from the catalyst contains no transition metal. It is purified from the metal of Groups I–III by conventional means, such as by treatment with an alcohol.

EXAMPLES

The present invention is further illustrated by the following Examples.

EXAMPLES 1

(a) Preparation of a polymeric carrier, viz. cross-linked ter-copolymer of ethylene, propylene, ethylidenenorbornene and vinylpyridine A weighed portion of 5 g of a commercial synthetic rubber, viz. ter-copolymer of ethylene, propylene and ethylidenenorbornene containing 1.54% by weight of unsaturated groups is dissolved in 75 ml of n-hexane and placed into a 250 ml ampule which ampule being thereupon charged with 4-vinylpyridine (VP) and asobisisobutyric dinitrile in the amounts of 10% and 1.5% of the rubber weight. The solution is vented in vacuum (residual pressure of at most $5 \cdot 10^{-4}$ mm Hg) and heated for 10 hours at 70° C.; thereafter, the solution is added with benzoyl peroxide in the amount of 1.5% of the rubber weight and the mixture is abandoned at 70° C. for an additional 10 hours. The resulting product is washed with said solvent, whereupon the solvent is distilled off and the product dried. The product is swellable but insoluble in hydrocarbons, chlorinated hydrocarbons; it is not swellable in lower alcohols, acetone, and other polar solvents; it contains in % by weight: N 0.76; C 84.52; H 13.86.

(b) Preparation of a catalyst, viz. $(C_5H_5)_2TiCl_2$ on a ter-copolymer of ethylene, propylene, ethylidenenorbornene and vinylpyridine A 1 g portion of the carrier prepared as above is placed, in air, into a mixture of n-heptane: dichloroethane (1:1 by volume). The swollen product is combined with 0.24 g of $(C_5H_5)_2TiCl_2$ dissolved in the same solvent mixture.

30 hours later (at 20° C.) the resulting complex is separated by filtration and thoroughly washed with said solvent mixture. The catalyst is stored in a medium of a liquid hydrocarbon or in a dried state. The product contains 1.06 wt.% of Ti.

(c) Polymerization of ethylene 0.13 g of a dry catalyst is placed into a 50 ml reactor, combined in vacuum with 15 ml of absolute n-octane and, after 4 hours, with 0.5 g of di(cyclohexenylethyl)aluminum chloride. The mixture is stirred for 3 hours, whereafter ethylene is fed into the system. The polymerization conditions: temperature 26° C., pressure 3 atm. 42 hours later (during which period the reaction rate was constant) the reaction is stopped by introducing 2 ml of methanol, and the reaction mixture is stirred for 1 hour. The reaction products are separated from the solution and washed with n-dodecane at 180° C. A hot polyethylene solution is separated from the catalyst by filtration. The solution is cooled, and the precipitated polymer is filtered off and dried to give 1.7 g of the product. The catalyst activity is 30 g of polyethylene per hour per 1 g of Ti. Intrinsic viscosity ($\eta_x+ = 3.2$). Intrinsic viscosity, expressed in dl/g in this and following Examples is determined in decalin at 135° C. The polymer contains no Ti.

EXAMPLE 2

The catalyst of Example 1 washed in air with hot dodecane form the polyethylene in Example 1c is reused for polymerization. To this end, it is combined with 15 ml of absolute n-octane, and 0.63 g of di(cyclohexenylethyl)aluminum chloride. 4 hours later ethylene is fed into the system. The polymerization conditions are: temperature 26° C., pressure 2.6 atm. 20 hours later, during which period the reaction rate is maintained constant, the reaction is stopped, and the polymer is treated in accordance with the procedure described in Example 1c. The yield is 0.5 g.

EXAMPLE 3

(a) Preparation of a polymer carrier

A 0.5 g portion of a commercial siloxane rubber of the formula:

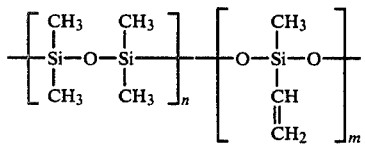

containing 2 wt.% of unsaturated groups is dissolved in 20 ml of cyclohexane and further treated with 0.05 g of 4-VP in a manner similar to that described in Example 1a. The resulting product contains 1.2 wt.% of N and is swellable, but insoluble in hydrocarbons and chlorinated hydrocarbon derivatives.

(b) Preparation of TiCl$_4$ catalyst on the carrier of Example 3a

The catalyst preparation is effected in a manner similar to that described in Example 1(b). To the carrier prepared in the above-mentioned amount, 0.11 g of TiCl$_4$ is added.

The catalyst contains 1.07 wt.% of Ti.

(c) Polymerization of ethylene

Polymerization and the polymer isolation are effected in much the same manner as in Example 1c. The polymerization conditions are: Al/Ti=10; temperature 40° C., pressure 6 atm, duration and the 5 hours.

The yield of polyethylene is 0.42 g; the catalyst activity 16 g of the polymer/g of Ti per hour. The polymer contains no Ti.

EXAMPLE 4

(a) Preparation of a carrier, viz. cross-linked ter-copolymer of ethylene, propylene, dicyclopentadiene and vinyldiphenylphosphine The preparation of the carrier is effected in accordance with the procedure described in Example 1a, where vinyldiphenylphosphine is taken in an amount of 20% of the rubber weight. The resulting product contains 2.6 wt.% of P, it is swellable, but insoluble in hydrocarbons and chlorinated hydrocarbon derivatives.

(b) Preparation of a catalyst, viz. nickel acetylacetonate on a cross-linked ter-copolymer of ethylene, propylene, dicyclopentadiene and vinyldiphenylphosphine To 0.5 g of the above-prepared carrier swollen in n-heptane, 30 ml of a solution of nickel acetylacetonate are added (0.020 mol/l) in diethyl ether. The mixture is allowed to stand for 24 hours at 20° C., washed with ether and heptane. The catalyst contains 1.23% of Ni.

(c) Polymerization of butadiene

The catalyst prepared in (b) is placed in a 70 ml reactor containing 20 ml. of absolute toluene, and 2 hours later—4 ml of butadiene, and 0.3 g of triisobutylaluminium are added. The condition of the reaction are: temperature 20° C., duration 10 hours. The catalyst activity—300 g of the polymer/g of Ni per hour.

EXAMPLE 5

(a) Preparation of a carrier, viz. a cross-linked ter-copolymer of ethylene, propylene, ethylidenenorbornene and diethylaminoethylmethacrylate The carrier is prepared in a manner similar to that of Example 1a, except that taken for the reaction are 0.2 g of the ter-copolymer, and 0.07 g of diethylaminoethylmethacrylate. The resulting product contains 2.84 wt.% of N, and its behaviour in solvents is similar to that of the product of Example 1a.

(b) Preparation of a catalyst, viz. (C$_5$H$_5$)$_2$TiCl$_2$ on a cross-linked ter-copolymer of ethylene, propylene, ethylidenenorbornene and diethylaminoethylmethacrylate The catalyst preparation is effected in a manner similar to that described in Example 1b. The catalyst contains 4.65 wt.% of Ti.

(c) Ethylene polymerization 0.3 g of the catalyst prepared as above is placed into a 100 ml reactor and combined with 40 ml of absolute n-heptane in argon atmosphere. 5 hours later a solution of Al(i—C$_4$H$_9$)$_2$Cl in absolute n-heptane is added into the reactor, the mixture is stirred for one hour, whereafter ethylene is fed thereinto. The polymerization conditions are: Al/Ti=110; temperature 20° C., pressure 3 atm, duration and 2.5 hours. The polymer is recovered in accordance with the procedure of Example 1c. The polymer yield is 12 g, the catalyst activity is 350 g of polyethylene/g Ti per hour; $\eta_x = 3.4$ dl/g.

EXAMPLE 6

(a) Preparation of a carrier, viz. a cross-linked ter-copolymer of ethylene, propylene, ethylidenenorbornene and methylmethacrylate The carrier preparation is effected in accordance with the procedure of Example 1a, except that 1 g of the ter-copolymer, and 0.33 g of methylmethacrylate are employed. The resulting product contains 10.6 wt.% of oxygen, and its behaviour in solvents is similar to that of the carrier of Example 1a.

(b) Preparation of a catalyst, viz. TiCl$_4$ on a cross-linked ter-copolymer of ethylene, propylene, ethylidenenorbornene and methylmethacrylate A 1 g portion of the carrier prepared as above is placed in a 100 flask, wherein 40 ml of absolute n-heptane have been previously charged. 5 hours later, 1 ml of TiCl$_4$ is added into the flask by way of condensation from a gaseous phase. The mixture is maintained for 20 hours at 20° C., whereafter the resulting catalyst is washed with n-heptane. The catalyst contains 7.97% by weight of Ti.

(c) Polymerization of ethylene

Polymerization and separation of the polymer are effected in accordance with the procedure described in Example 1c. As the co-catalyst use is made of Al(i—C$_4$H$_9$)$_2$Cl. The polymerization conditions are: Al/ti=10; temperature 20° C., pressure 4 atm; the duration is 7 hours. The catalyst activity is 100 g of polyethylene/g Ti per hour.

EXAMPLE 7

(a) Preparation of a carrier, viz. a cross-linked ter-copolymer of ethylene, propylene, ethylidenenorbornene and methacrylic acid The carrier preparation is effected in accordance with the procedure in Example 1a, using methacrylic acid as a polar monomer. The resulting product contains 2.97 wt. % of oxygen.

(b) Preparation of a catalyst, viz. TiCl$_4$ on a cross-linked ter-copolymer of ethylene, propylene, ethylidenenorbornene and methacrylic acid The catalyst preparation is effected in accordance with the procedure of Example 6b. TiCl$_4$ is employed in the proportion of 2 mol. of TiCl$_4$ per 1 mol. of methacrylic acid. The catalyst contains 4.3 wt.% of Ti.

(c) Polymerization of ethylene 0.2 g of the catalyst is placed in a 70 ml reactor, and combined in vacuum with 20 ml of absolute n-heptane, and 10 hours later, with triheptylaluminium at the ratio of Al/Ti=6. The mixture is stirred for 2 hours, then ethylene is fed into the reactor. The polymerization conditions are: temperature 40° C., pressure 6 atm, for 4 hours. The yield of polyethylene is 6.8 g, the catalyst activity is 200 g of polyethylene per 1 g of Ti per hour.

EXAMPLE 8

The carrier prepared in accordance with the procedure of Example 1a is employed herein.

(a) Preparation of a catalyst, viz. VCl$_4$ on a cross-linked ter-copolymer of ethylene, propylene, ethylidenenorbornene and vinylpyridine 1 g of a cross-linked ter-copolymer of ethylene, propylene, vinylidenenorbornene and vinylpyridine swollen in heptane, and 0.2 g of VCl$_4$ are combined in the atmosphere of argon. The mixture is allowed to stand for 3 days at 20° C. The resulting catalyst is separated by filtration, washed and stored in absolute n-heptane in sealed ampules. The catalyst contains 1.1 wt.% of V.

(b) Polymerization of ethylene 0.06 g of the catalyst is placed in a 70 ml reactor, combined with 20 ml of absolute n-heptane in vacuum and, after 10 hours, with Al(i—C$_4$H$_9$)$_2$Cl at the ratio of Al/V=150.

The mixture is stirred for 1 hour, then ethylene is fed into the reactor. The polymerization conditions are: temperature 20° C., pressure 2 atm, duration 5 hours.

The yield of polymer is 1.65 g, the catalyst activity is 500 g of polyethylene/g V per hour; $\eta_x=3.0$ dl/g. The polymer contains no V.

EXAMPLE 9

Polymerization of ethylene with a periodic separation of the catalyst from the reaction product A portion of 0.3 g of the catalyst prepared as in Example 8, is placed in a 200 ml metal reactor, combined with 100 ml of absolute n-octane and 6 ml of a solution of dicyclohexenylaluminium chloride (0.26 mol/l in heptane). The polymerization of ethylene is effected at 20° C. under the constant pressure of 6 atm. The progress of the reaction is evaluated by a pressure drop in an intermediate thermostated measuring vessel. 2 hours later the supply of ethylene is discontinued, the pressure is relieved, and the temperature in the reactor is increased to 160° C. to separate the catalyst from the polymer. 2 hours later the reactor is cooled to 20° C., the ethylene supply is renewed and the polymerization is continued for additional 2 hours. Then the reactor is heated to 160° C. and a hot solution of the polymer is separated from the catalyst. The yield is 20 g; $\eta_x=3.1$ dl/g. The polymer contains no V.

EXAMPLE 10

Copolymerization of ethylene and propylene 0.17 g of the catalyst of Example 8 is placed into a reactor with 20 ml of absolute n-heptane and 6 ml of a solution of triheptylaluminium (0.56 mol/l) in n-heptane. 2 hours later a mixture of ethylene and propylene (at the volumetric ratio of 1:3) is fed into the system. The copolymerization is effected at 20° C. under 5 atm pressure. The reaction is stopped 10 hours later, and the catalyst is separated from the solution; the filtrate is treated with methanol, and the precipitated copolymer is dried. The copolymer contains 45 mol.% of propylene units.

EXAMPLE 11

(a) Preparation of a catalyst, viz. TiCl$_4$ and Al(i—C$_4$H$_9$)$_3$ on a cross-linked ter-copolymer of ethylene, propylene, ethylidenenorbornene and vinylpyridine A portion of 0.5 g of the product produced in Example 1a is placed in a 50 ml ampule containing 20 ml of absolute n-heptane. 0.1 g of TiCl$_4$ is distilled into the same ampule, the ampule sealed, maintained for 24 hours at room temperature and for 2 hours at 120° C. Then the ampule is opened, the catalyst washed with n-heptane and combined with 20 ml of a solution of triisobutylaluminium in n-heptane (0.26 mol/l). The mixture is maintained at room temperature for 24 hours and then again washed with n-heptane. The catalyst contains, % by weight: Ti—1.1; Al—0.6.

(b) Polymerization of ethylene

A portion of 0.22 g of the catalyst is placed in a 50 ml glass reactor. 20 ml of n-heptane and 5.6 ml of a solution of triisobutylaluminium (0.26 mol/l) in n-heptane are combined therewith. The reaction mixture is stirred by means of a magnetic stirrer for 6 hours at 40° C., whereafter ethylene is fed into the system under the pressure of 3 atm. One hour later a sample of the polymer is taken and after one more hour the supply of ethylene is discontinued; 5 ml of methanol are introduced into the reactor and the mixture is stirred for 1 hour. The reaction products are separated from the solution, dried and extracted at 180° C., in n-dodecane. The hot polyethylene solution is separated from the catalyst by filtration; the solution is cooled, and polyethylene is filtered off and dried. The catalyst activity is 50 g of the polymer/g Ti per hour. $\eta_x = 2.4$ dl/g (in an hour); $\eta_x 32$ 4.5 dl/g (in two hours).

EXAMPLE 12

Polymerization of ethylene

Using the procedure and apparatus described in Example 9, the continuous polymerization of ethylene is conducted on the catalyst prepared in Example 11a for 72 hours at 160° C. and under 16 atm pressure. As the co-catalyst $Al(C_7H_{15})_3$ is used. The ethylene supply rate remains practically constant during the polymerization. The catalyst activity is 120 g of polyethylene/g Ti per hour. $\eta_x = 1.5$ dl/g.

EXAMPLE 13

Polymerization of propylene 0.23 g of the catalyst prepared as in Example 11a 20 ml of absolute n-heptane and 5.6 ml of a solution of triheptylaluminium (0.26 mol/l) are combined in vacuum. The mixture is stirred for 5 hours at 40° C., whereafter propylene is inroduced (2.5 atm). After 20 hours the reaction is stopped, the polymer is precipitated with methanol, washed and dried to give 0.96 g of the final polymer. The catalyst activity is 19 g of the polymer/g Ti per hour.

EXAMPLE 14

Polymerization of butadiene 0.2 g of the catalyst prepared as in Example 11a 15 ml of absolute toluene are combined in vacuum, and 15 hours later—with 4 ml of butadiene, and 0.3 g of triisobutylaluminium. The reaction conditions are: temperature 20° C., duration 20 hours. The resulting product is isolated in accordance with the above-described procedure and dried. The catalyst activity is 30 g of the polymer/g Ti per hour.

EXAMPLE 15

(a) Preparation of a catalyst, viz. $TiCl_4$ on natural rubber

A 2 g portion of natural rubber swollen in heptane 4 g of $TiCl_4$ are combined. The mixture is maintained at room temperature for two days, whereafter the catalyst is washed with heptane and dried. The catalyst contains 1.9 wt.% of Ti.

(b) Polymerization of ethylene

The polymerization is effected in accordance with the procedure, and under the conditions of Example 7c. The catalyst activity is 170 g of the polymer/g Ti per hour.

EXAMPLE 16

Polymerization of vinylcyclohexane 0.3 g of the catalyst prepared in Example 1 and 45 ml of cyclohexane are charged into a reactor in vacuum, and 4 hours later 0.2 g of diisobutylaluminium chloride, and after 2 more hours 8 g of vinylcyclohexane are combined therewith. Polymerization is effected at 60° C. under vigorous stirring. After one hour, the polymerization is stopped by way of adding 1 ml of hexanol into the reactor. The polymer is separated from the catalyst, washed with cyclohexane and dried to a constant weight. The yield is 30%, and the catalyst activity is 800 g of the polymer/g Ti per hour. No vinylidenecyclohexane is present in the reaction mixture during the test and thereafter.

EXAMPLE 17

Polymerization of butadiene

A reactor provided with a stirrer is charged with 0.3 g of the catalyst prepared in Example 1, and 100 ml of absolute toluene in vacuum, 5 hours later, during which period the catalyst becomes swollen, and 25 g of butadiene and 0.7 g of triisobutylaluminium are introduced into the reactor. The polymerization temperature is 20° C. After 40 hours the reaction is stopped, and the polymer is washed with toluene, then with a mixture of toluene and ethanol, and then dried to a constant weight. The yield is 92% which corresponds to 7.6 g of the polymer/g Ti per hour. The polymer contains 1,2-units in the amount exceeding 90%.

EXAMPLE 18

Polymerization of butadiene

A reactor provided with a stirrer is charged with 0.14 g of the catalyst prepared in Example 1, and 8 ml of absolute toluene in vacuum. 4 hours later 1 g of butadiene and 0.2 g of di(cyclohexenylethyl)aluminum chloride are added thereto. Polymerization is effected at 20° C. for 20 hours; then 1 ml of methanol is introduced into the reactor and the precipitated polymer is separated, washed and dried to a constant weight. The polymer yield is 0.12 g. The polymer contains 90% of trans- units and 10% of 1,2- units.

EXAMPLE 19

Polymerization of isoprene

A reactor provided with a stirrer is charged with 0.1 g of the catalyst prepared in Example 1, and 20 ml of absolute heptane in vacuum. 2 hours later 0.36 g of $Al(i-C_4H_9)_3$, and after 2 more hours, 2 ml of isoprene are added into the reactor. Polymerization is effected at 30° C. for 5 hours. The reaction is then stopped and the polymer is isolated in accordance with the procedure of Example 1c. The polymer yield is 0.3 g. The polymer contains 50% of 1,2- units, and 50% of 1,4-trans units.

EXAMPLE 20

(a) Preparation of a catalyst, viz. $(C_5H_5)_2TiCl_2$ on 1,2polybutadiene

A 5 g portion of polybutadiene prepared in accordance with the procedure of Example 17 swollen in a mixture of heptanedichloroethane (1:1 by volume) and 2 g of $(C_5H_5)_2TiCl_2$ dissolved in the same solvent mixture are combined. The mixture is allowed to stand for two days at 20° C. The resulting catalyst is separated by filtration and thoroughly washed with n-heptane. The catalyst contains 1.45% by weight of Ti.

(b) Polymerization of ethylene 0.006 g of the catalyst combined in vacuum with 20 ml of absolute n-heptane, and 0.36 g of diisobutylaluminum chloride. The polymerization conditions are: temperature 20° C., pressure 3 atm. After 14.5 hours, during which period the reaction rate is maintained constant, the reaction is stopped; the polymer is separated and treated in accordance with the procedure of Example 1c. The yield is 3 g, and the catalyst activity is 240 g of polyethylene/g Ti per hour.

EXAMPLE 21

(a) Preparation of a catalyst, viz. $(C_5H_5)_2TiCl_2$ and $Al(i—C_4H_9)_2Cl$ on polybutadiene-1,2

A 1 g portion of the product prepared in accordance with the procedure of Example 20a swollen in n-heptane is combined with 0.3 g of diisobutylaluminum chloride in vacuum. The mixture is maintained in vacuum at 60° C. for 24 hours. Then, the resulting catalyst is thoroughly washed with heptane to remove the non-combined diisobutylaluminum chloride and then stored in sealed ampules. The catalyst contains, % by weight: Ti—1.4; Al—0.45.

(b) Polymerization of ethylene 0.6 g of the catalyst is combined with 20 ml of absolute dichloroethane in vacuum. 3 hours later ethylene is fed into the system. The polymerization conditions are: temperature 40° C., pressure 3 atm. After 5 hours the reaction is stopped; the polymer is separated and treated in accordance with the procedure described in Example 1c. The catalyst activity is 30 g of the polymer/g Ti per hour.

EXAMPLE 22

Polymerization of ethylene 0.04 g of the catalyst prepared in Example 20a swollen in 40 ml of absolute n-decane is placed into a 100 ml reactor, with 0.49 g of $Al(i—C_4H_9)_2Cl$ in vacuum. 2 hours later ethylene is fed into the system and the polymerization is then effected at 20° C. under 3 atm pressure. After 10 hours. The polymerization of ethylene is discharged from the reactor; the polymer is separarated from the catalyst (to this end the mixture in the reactor is heated until the polyethylene is dissolved) and also discharged from the reactor. Thereafter the reactor is cooled to 200° C.; ethylene is again fed thereinto and the polymerization is continued.

These operations are repeated several times, and the entire experiment lasts for 2,000 hours. The polymerization velocity remains, during this period, substantially constant. The polymer yield is 240 g; the catalyst activity is 207 g of polyethylene/g Ti per hour.

EXAMPLE 23

(a) Preparation of a carrier, viz. cross-linked ter-copolymer of propylene, ethylidenenorbornene and methylmethacrylate The carrier preparation is effected in accordance with the procedure of Example 6a, except that as the polar monomer 0.17 g of methylmethacrylate is used. The resulting product contains 5.3% of oxygen.

(b) Preparation of a catalyst, viz. $Al(i—C_4H_9)_3TiCl_4$ and cross-linked ter-copolymer of ethylene, propylene, vinylidenenorbornene and methylmethacrylate 1 g of said carrier is placed into a 100 ml flask in 40 ml of absolute n-octane. When the carrier is completely swollen, the flask is inoculated with 0.5 g of $Al(i—C_4H_9)_3$ in the atmosphere of argon, and the mixture is maintained for 30 hours at 20° C.

The resulting complex is thoroughly washed with n-octane, combined with 0.5 g of $TiCl_4$ and the mixture is maintained for an additional 30 hours at 20° C. The resulting product is washed and stored in n-heptane. The catalyst contains, wt.%: Al—8.2; Ti—14.6.

(c) Polymerization of ethylene

Preparation, polymerization and isolation of the polymer are effected as in Example 11c. As the co-catalyst $Al(i—C_4H_9)_2Cl$ is used. The polymerization conditions are: Al/Ti=6; temperature 30° C., pressure 4 atm, duration 4 hours. The catalyst activity is 180 g of the polymer/g Ti per hour.

EXAMPLE 24

(a) Preparation of a catalyst, viz. $TiCl_4$, $Al(i—C_4H_9)_3$ on natural rubber A portion of 0.5 g of natural rubber is placed, in vacuum, in a 70 ml ampule containing 30 ml of absolute n-heptane. 5 hours later, 0.1 g of $TiCl_4$ is condensed into the ampule; the mixture is maintained at 20° C. for 30 hours. The resulting product is washed with absolute n-heptane and combined in vacuum with 20 ml of a solution of $Al(i—C_4H_9)_3$ (0.26 mol/l) in absolute heptane. The mixture is heated for 2 hours to 140° C., and maintained at this temperature for 0.5 hour. The resulting catalyst is washed and stored in absolute heptane. The catalyst contains, % in by weight: Ti—1.1; Al—0.5.

(b) Polymerization of ethylene

The experiment preparation and isolation of the polymer are effected in accordance with the procedure of Example 11c. As the co-catalyst $Al(i—C_4H_9)_2Cl$ is used. The polymerization conditions are: Al/Ti=10, polymerization temperature 140° C., pressure 3 atm, duration 20 hours. The catalyst activity is 10 g of the polymer/g Ti per hour, $\eta_x = 5.1$ dl/g.

EXAMPLE 25

(a) Preparation of a catalyst, viz. $VO(OC_2H_5)_3$ on 1,2-polybutadiene

A 1 g portion of polybutadiene prepared in Example 17 swollen in n-heptane is combined with 0.3 g of $VO(OC_2H_5)_3$ in argon. The mixture is maintained for 48 hours at 20° C. The resulting catalyst is washed with absolute heptane and dried. The catalyst contains 1.6% by weight of V.

(b) Polymerization of ethylene

The polymerization of ethylene is effected in accordance with the procedure of Example 20b. The polymerization is stopped after 20 hours. The yield is 3.8 g; the catalyst activity is 200 g of the polymer/g per hour. The polymer contains no V.

EXAMPLE 26

(a) Preparation of a carrier, viz. a cross-linked ter-copolymer of ethylene, propylene, vinylidenenorbornene and allyl alcohol The carrier is prepared in accordance with the procedure of Example 1a. The carrier contains 0.68 wt. % of 0.

(b) Preparation of a catalyst based on Ti(OC$_4$H$_9$)$_3$Cl and ter-copolymer of ethylene, propylene, vinylidenenorbornene and allyl alcohol A 1 g portion of the carrier swollen in absolute heptane is combined with 0.5 g of Ti(OC$_4$H$_9$)$_3$Cl in vacuum. The mixture is maintained at 70° C. for 10 hours. The resulting complex is washed and stored in absolute heptane. The catalyst contains 1.54 wt.% of Ti in the form of ∿∿O—Ti(OC$_4$H$_9$)$_3$.

(c) Polymerization of ethylene

Polymerization is effected in accordance with the procedure of Example 20b. The reaction is stopped after 2 hours. The catalyst activity is 1,100 g of the polymer/g Ti per hour.

EXAMPLE 27

(a) Preparation of a catalyst based on MgC$_3$H$_7$Cl, TiCl$_4$ and a cross-linked ter-copolymer of ethylene, propylene, ethylidenenorbornene and methacrylic acid A 0.5 g portion of the carrier prepared in Example 7a added is a solution of the Grignard reagent in diethyl ether (2 mol. C$_3$H$_7$MgCl per 1 mol. of methacrylic acid) and the mixture is allowed to stand overnight. Thereafter, the mixture is washed with ether and the latter is then distilled off. The residue is combined with 20 ml of a solution of TiCl$_4$ (0.3 mol/l) in n-decane and heated at 135° C. for 6 hours. The resulting catalyst is washed with n-heptane and stored in sealed ampules. The catalyst contains, wt.%: Ti—6.2; Mg—4.1.

(b) Polymerization of ethylene

The preparation for the polymerization and separation of the polymer are effected in accordance with the procedure of Example 1a.

As the co-catalyst Al(C$_7$H$_{15}$)$_3$ is used. The polymerization conditions are: Al/Ti=20; temperature 40° C.; pressure 5 atm, duration 1 hour. The catalyst activity is 500 g of the polymer/g Ti per hour: $\eta_x=7.2$ dl/g.

EXAMPLE 28

The carrier is prepared in accordance with the procedure of Example 1a, but with 12 wt.% of vinylpyridine being grafted thereonto. The catalyst is prepared as in Example 8a by depositing 5.4 wt.% of VCl$_4$ (1.43 wt.% of V).

Polymerization of ethylene

The preparation, polymerization, and isolation of the polymer are effected in accordance with the procedure of Example 8a. As the co-catalyst Al(i—C$_4$H$_9$)$_2$Cl is used. The experiment conditions are: Al/V=3:1, temperature 50° C.; pressure 3 atm, duration 2 hours. The catalyst activity is 350 g of the polymer/g V per hour; $\eta_x=6.6$ dl/g.

EXAMPLE 29

(a) Preparation of a catalyst, viz. VCl$_4$, nickel acetylacetonate (Ni(C$_5$H$_7$O$_2$)$_2$) and a cross-linked ter-copolymer of ethylene, propylene, ethylidenenorbornene and vinylpyridine 0.2 g of the catalyst of Example 28 is treated with 28 ml of a solution of nickel acetylacetonate in benzene (0.3·10$^{-3}$ mol/l). The mixture is maintained at 20° C. for 10 hours. Then the catalyst is washed with a mixture of heptane-benzene (1:1 by volume). The catalyst contains, wt.%: V—1.4; Ni—0.07.

(b) Polymerization of ethylene

The catalyst prepared as above is used herein. The preparation, polymerization and isolation of the polymer are effected as in Example 8b. As the co-catalyst Al(i—C$_4$H$_9$)$_2$Cl is used. The polymerization conditions are: Al/V=3:1; temperature 50° C.; pressure 3 atm; duration 5 hours. The catalyst activity is 245 g of the polymer/g (V+Ni); $\eta_x=2.6$ dl/g.

EXAMPLE 30

The catalyst is prepared in accordance with the procedure of Example 29a, but with nickel acetyl acetonate being deposited at the ratio V/Ni=10.

Polymerization of ethylene

The polymerization is effected in accordance with the procedure of Example 29b. The catalyst activity is 170 g of the polymer/g of (V+Ni). $\eta_x=1.8$ dl/g. The polymer contains no Ni, V.

EXAMPLE 31

The catalyst is prepared in accordance with the procedure of Example 29a, but with nickel acetylacetonate being deposited in the ratio V/Ni=40.

Polymerization of ethylene

The polymerization is effected in accordance with the procedure of Example 29b. The catalyst activity is 340 g of the polymer/g of (V+Ni). $\eta_x=5.1$ dl/g.

What is claimed is:

1. A process for the polymerization of α-olefines, and conjugated and non-conjugated dienes comprising reacting the same in the presence of a catalyst comprising a catalyst containing from 0.1 to 50 wt.% of a compound of a transition metal from Groups IV–VIII of the periodic system chemically combined and distributed over the surface of a rubbery polymeric carrier containing from 1 to 50 wt.% of a moiety selected from the Group consisting of electron-donor, electron-acceptor groups, and mixtures thereof; a co-catalyst of an organometallic compound of a metal from Groups I–III of the periodic system with the molar ratio of the co-catalyst to the compound of the transition metal from Groups IV–VIII ranging from 1 to 500, said catalyst being in the form of a gel swellable but insoluble in the reaction medium, in a solvent selected from the group consisting of a liquid hydrocarbon and a halogenated hydrocarbon at a temperature of no more than 200° C. under a pressure of from 0 to 100 atm; and separating the reaction products from the catalyst.

2. The process for polymerization so claimed in claim 1, wherein the polymerization of propylene is effected in the presence of a catalyst containing TiCl$_3$, Al(i-

—C$_4$H$_9$)$_2$Cl, and a co-catalyst Al(C$_7$H$_{15}$)$_3$ in the medium of absolute heptane.

3. The process for polymerization as claimed in claim 1, wherein the copolymerization of α-olefines and non-conjugated dienes is conducted at a temperature of from 140° to 200° C., and the catalyst is separated from the polymerization products and continuously recycled back to the polymerization.

4. The process for the polymerization as claimed in claim 1, wherein the polymerization is conducted at a temperature within of from 0° to 80° C. and the catalyst is separated from the reaction products at a temperature exceeding the melting point of the polymerization product.

5. The polymerization process as claimed in claim 4, wherein the polymerization of vinylcyclohexane is conducted in the presence of a catalyst containing (C$_5$H$_5$)$_2$TiCl$_2$, and a co-catalyst of Al(i—C$_4$H$_9$)$_2$Cl in the absolute cyclohexane medium.

6. The process for the polymerization as claimed in claim 4, wherein the catalyst, after separation of the polymerization products, is recycled back to the polymerization, and these operations are repeated until the catalyst is destroyed.

7. The process for polymerization as claimed in claim 6, wherein the polymerization is conducted in the presence of a catalyst containing a compound of a transition metal from Group IV–VIII selected from the group consisting of (C$_5$H$_5$)$_2$TiCl$_2$, and VCl$_4$, with the catalyst being separated from the polymerization products in air.

8. The process for the polymerization as claimed in claim 4, wherein the polymerization of conjugated dienes is conducted in the presence of a catalyst containing (C$_5$H$_5$)$_2$TiCl$_2$, a co-catalyst selected from the group consisting of an organoaluminium and a halogenorganoaluminum compound.

9. The process for polymerization as claimed in claim 8, wherein to produce 1,2-polybutadiene, polymerization of butadiene is conducted in the presence of a catalyst containing (C$_5$H$_5$)$_2$TiCl$_2$, a carrier of a cross-linked copolymer of ethylene, propylene, ethylidenenorbornene and vinylpyridine, and a co-catalyst of Al(i—C$_4$H$_9$)$_3$.

* * * * *